United States Patent
Inoue et al.

(10) Patent No.: US 11,523,251 B2
(45) Date of Patent: Dec. 6, 2022

(54) INFORMATION PROCESSING SYSTEM, INFORMATION PROCESSING DEVICE, AND INFORMATION PROCESSING METHOD

(71) Applicants: Nissan Motor Co., Ltd., Kanagawa (JP); RENAULT S.A.S., Boulogne-Billancourt (FR)

(72) Inventors: Hirofumi Inoue, Kanagawa (JP); Jo Nishiyama, Kanagawa (JP); Takehito Teraguchi, Kanagawa (JP); Yu Shikoda, Kanagawa (JP); Shota Okubo, Kanagawa (JP)

(73) Assignees: Nissan Motor Co., Ltd., Kanagawa (JP); RENAULT S.A.S., Boulogne-Billancourt (FR)

( * ) Notice: Subject to any disclaimer, the term of this patent is extended or adjusted under 35 U.S.C. 154(b) by 6 days.

(21) Appl. No.: 17/273,219

(22) PCT Filed: Sep. 4, 2018

(86) PCT No.: PCT/IB2018/001141
§ 371 (c)(1),
(2) Date: Mar. 3, 2021

(87) PCT Pub. No.: WO2020/049330
PCT Pub. Date: Mar. 12, 2020

(65) Prior Publication Data
US 2021/0204092 A1  Jul. 1, 2021

(51) Int. Cl.
*H04W 4/024* (2018.01)
*H04W 4/44* (2018.01)
*H04W 4/02* (2018.01)

(52) U.S. Cl.
CPC .......... *H04W 4/024* (2018.02); *H04W 4/023* (2013.01); *H04W 4/44* (2018.02)

(58) Field of Classification Search
CPC ....... H04W 4/024; H04W 4/023; H04W 4/44; G01C 21/20; G01C 21/362;
(Continued)

(56) References Cited

U.S. PATENT DOCUMENTS

| 2012/0062357 A1* | 3/2012 | Slamka | G01C 21/20 340/4.11 |
| 2014/0107916 A1* | 4/2014 | Urup | G01C 21/343 701/487 |

(Continued)

FOREIGN PATENT DOCUMENTS

| JP | 2002-340587 A | 11/2002 |
| JP | 2006-250874 A | 9/2006 |

(Continued)

*Primary Examiner* — Marcus Hammonds
(74) *Attorney, Agent, or Firm* — Osha Bergman Watanabe & Burton LLP

(57) ABSTRACT

The information processing device includes a communicator 31 for communicating with a vehicle 40 and a mobile device operated by a user, and a controller 33 for controlling the communicator 31, and the controller 33 acquires position information indicating the position of the vehicle 40 and position information indicating the position of the mobile device via the communicator 31, and outputs sound data for identifying the vehicle 40 from the communicator 31 to the mobile device in accordance with the distance between the position of the vehicle 40 and the position of the mobile device.

12 Claims, 5 Drawing Sheets

(58) Field of Classification Search
CPC ............ G01C 21/3629; G01C 21/3438; G06Q 10/02; G06Q 10/0631; G06Q 50/30
See application file for complete search history.

(56) References Cited

U.S. PATENT DOCUMENTS

| | | | |
|---|---|---|---|
| 2016/0169687 A1* | 6/2016 | Yu | G01C 21/3688 |
| | | | 701/516 |
| 2017/0259786 A1 | 9/2017 | Burgkhardt et al. | |
| 2018/0040093 A1 | 2/2018 | Boesen | |
| 2018/0107222 A1* | 4/2018 | Fairfield | G06Q 10/02 |

FOREIGN PATENT DOCUMENTS

| | | |
|---|---|---|
| JP | 2007-072588 A | 3/2007 |
| JP | 2012-088925 A | 5/2012 |
| JP | 2012-225782 A | 11/2012 |
| JP | 2016-201008 A | 12/2016 |
| WO | 2018035848 A1 | 3/2018 |

\* cited by examiner

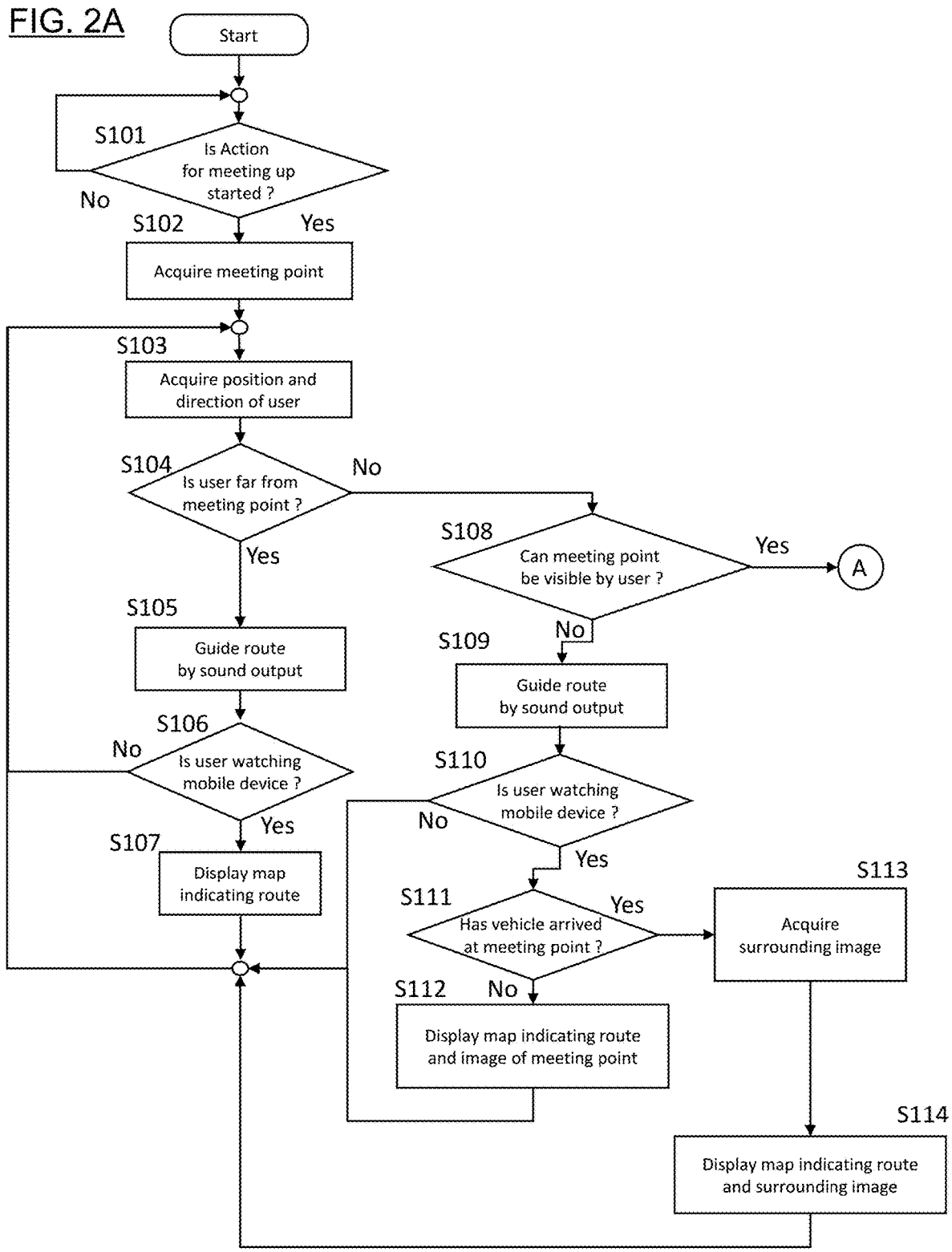

INFORMATION PROCESSING SYSTEM, INFORMATION PROCESSING DEVICE, AND INFORMATION PROCESSING METHOD

TECHNICAL FIELD

The present invention relates to an information processing system, an information processing device, and an information processing method.

BACKGROUND ART

Conventionally, a vehicle dispatch support method for assisting taxi dispatch based on a vehicle dispatch request from a passenger has been known (for example, Patent Document 1). This vehicle dispatch support method acquires desired riding position information from the passenger and present position information of taxis, and after receiving the desired riding position information from the passenger, generates a vehicle dispatch request number in a vehicle dispatch request table, extracts a candidate dispatch taxi based on present position information obtained from a plurality of taxis, and transmits vehicle dispatch offering information to a crew device of the candidate dispatch taxi. Then, this vehicle dispatch support method decides to dispatch a taxi located at a position closest to the passenger from among the taxis that respond to the vehicle dispatch offering information with a request for vehicle dispatch, and distributes map information including the position of the taxi and the desired riding position of the passenger to a crew device of the decided taxi and the mobile phone device of the passenger. That is, since both crew member and passenger are provided with the map information including their positions, the crew member and the passenger can visually confirm the approaching states of each other.

PRIOR ART DOCUMENT

Patent Document

[Patent Document 1] JP 2012-88925 A

SUMMARY OF INVENTION

Problems to be Solved by Invention

However, since the passenger needs to search for a taxi while comparing both a display screen of the mobile phone device and the vehicle, there is a problem that it takes time to find the vehicle, and the user cannot easily identify the vehicle to be ridden.

A problem to be solved by the present invention is to provide an information processing device, an information processing system, and an information processing method that enable a user to easily identify a vehicle to be ridden.

Means for Solving Problems

The present invention solves the above problem through acquiring position information indicating a direction of a head of the user or direction information indicating the user's line of sight direction, and position information indicating a position of a mobile device, and outputting sound data for identifying the vehicle from a communicator to the mobile device in accordance with a relationship between the direction of the head and the position of the vehicle, or a relationship between the line of sight direction and the position of the vehicle.

Effect of Invention

According to the present invention, the user can easily identify the vehicle to be ridden.

BRIEF DESCRIPTION OF DRAWINGS

FIG. 2A is a flowchart showing an information processing procedure executed by the information processing system of FIG. 1;

MODE(S) FOR CARRYING OUT THE INVENTION

Figure 1:
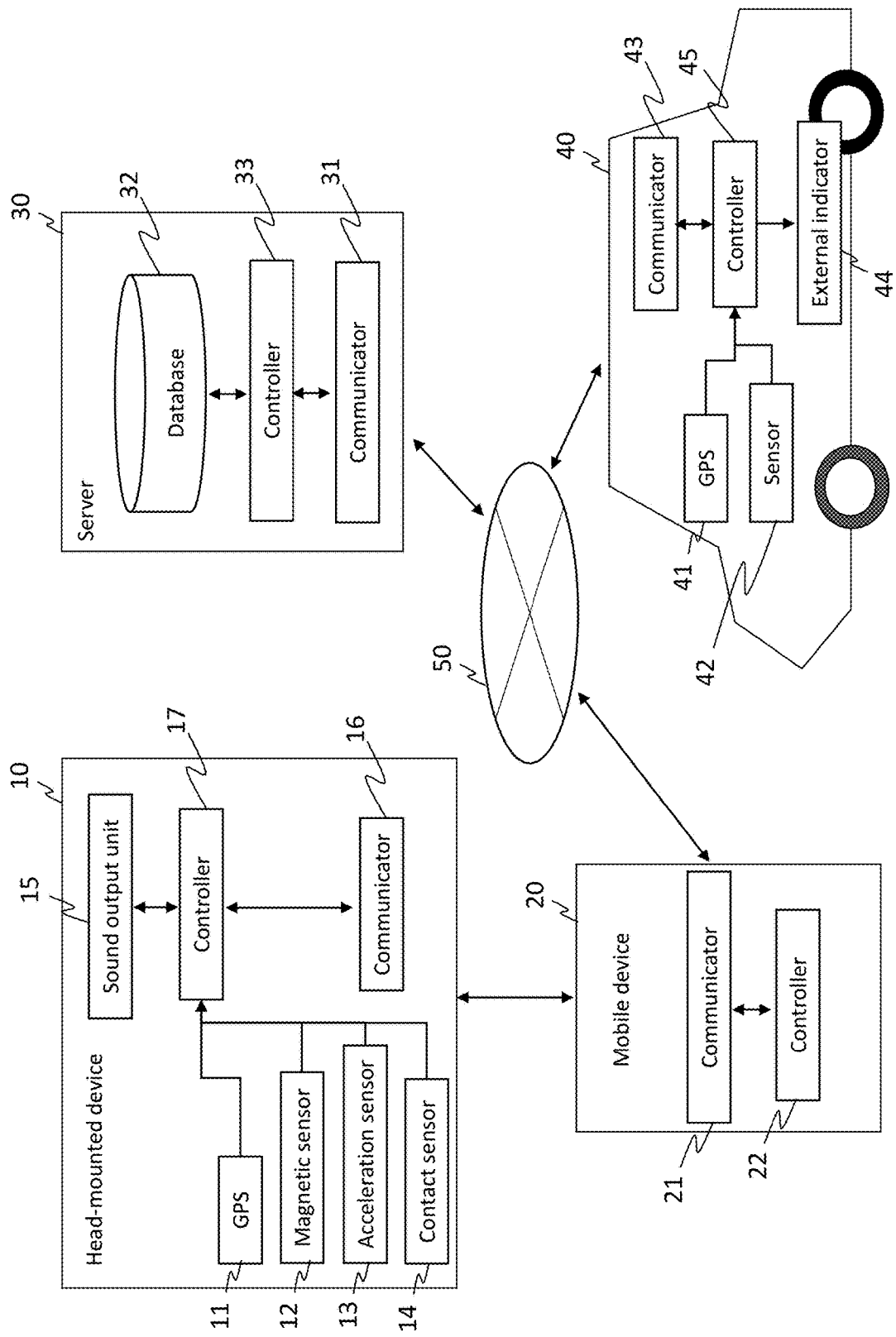
FIG. 1 is a block diagram showing an embodiment of an information processing system according to the present invention.

Hereinafter, one or more embodiments of an information processing system according to the present invention will be described with reference to the drawings. FIG. 1 is a block diagram showing an information processing system according to one or more embodiments of the present invention, and the system of the present embodiment includes a head-mounted device 10, a mobile device 20, a server 30, a vehicle 40, and a telecommunication network 50 configuring a telecommunication network.

The system of the present embodiment selects a vehicle suitable for usage conditions based on the usage conditions desired by the user and dispatches the selected vehicle 40 to a predetermined departure location in a car sharing, taxi dispatch or the like. The vehicle 40 is not limited to a vehicle which the crew operates, and may be a vehicle such as an unmanned taxi (a robot taxi) with an autonomous driving function. After acquiring the usage conditions from the user, the server 30 selects the vehicle 40 suitable for the usage conditions, and generates a vehicle dispatch schedule for the selected vehicle 40. Then, the server 30 outputs information including vehicle dispatch plan to the vehicle 40. The vehicle 40 travels along the vehicle dispatch schedule. At this time, when the vehicle 40 is an unmanned taxi, the drive system such as steering is autonomously controlled so that the vehicle 40 travels in a traveling plan in accordance with the vehicle dispatch schedule.

The server 30 outputs the information on the vehicle dispatch schedule and the information on the selected vehicle to the mobile device 20. The user can conform a departure position of the vehicle 40, departure time and the like by conforming the information regarding the vehicle dispatch schedule with the mobile device 20. The mobile device 20 is a mobile device that is small enough for a user to carry around, and may be able to communicate with at least the server 30.

Incidentally, for example, when the user is waiting for the arrival of the vehicle 40 at a place designated by the server 30 (a place where the user meets the vehicle 40) in order to ride on the dispatched vehicle 40, it may be difficult for the user to grasp what kind of vehicle the dispatched vehicle is, from which direction the dispatched vehicle is approaching, and how far the distance is from a meeting point to the vehicle 40. For example, if the meeting point with a vehicle is set at a car stop where the vehicles available are limited to specific vehicles, such as a taxi stop, there are many vehicles similar to the dispatched vehicle, and it is difficult for the user to identify the dispatched vehicle from among a large number of vehicles.

Further, for example, when the meeting point where the user meets up with the vehicle is set to a place where the vehicle can be stopped safely on a general road, it is difficult to grasp from which direction the dispatched vehicle is approaching, how far the vehicle 40 is currently away from the meeting point, and the like. In particular, when the meeting point with the vehicle is set along general road, the user is required to enter the dispatch vehicle without taking too time because it is better that parking time of the vehicle is as short as possible. Therefore, a system is required in which a dispatched vehicle can be easily identified.

In the present embodiment, by the configuration and the control process described below, a system is realized that enables the user to easily identify the vehicle to be ridden (dispatched vehicle).

A specific configuration of the system will be described with reference to FIG. 1. The head-mounted device 10 is a device with various sensors and communicators, such as a hearable device. The head-mounted device 10 is a device that can be mounted on a head of a user, such as an earphone or a headphone. Since the head-mounted device is configured to be mounted on the head unlike a device operated by the user's hand, such as a smart phone or a mobile phone, it can detect the direction of the head, that is, the user's line of sight direction. For example, when the user's body is facing north and the user's face is facing east, it is possible for the mobile device 20 such as a smart phone, which will be described later, to detect that the user's body is facing north, but it is difficult for the mobile device 20 to detect that the user's face is facing east. On the other hand, the head-mounted device 10 can detect that the user's face is facing east.

The head-mounted device 10 includes a GPS 11, a magnetic sensor 12, an acceleration sensor 13, a contact sensor 14, a sound output unit 15, a communicator 16, and a controller 17. The GPS 11 is a system that measures the position of the head-mounted device 10. Since the head-mounted device 10 is mounted on the head of the user, the position detected by GPS 11 corresponds to the position of the user. The magnetic sensor 12 and the acceleration sensor 13 detect the direction of the head-mounted device 10, that is, the direction in which the user is facing, and/or the direction of the head. The contact sensor 14 is a sensor for detecting that the head-mounted device 10 has been attached to the head. The sound output unit 15 is a device for directly outputting sound to the user's ear, and is configured by a vibration plate, a coil, and the like. The communicator 16 is a device for communicating with the mobile device 20. The communicator 16 performs communication with the communicator 21 included in the mobile device 20 under the short-range wireless communication standard. The controller 17 controls the GPS 11, the magnetic sensor 12, the acceleration sensor 13, the contact sensor 14, the sound output unit 15, and the communicator 16. The controller 17 includes hardware and software, and includes a ROM (Read Only Memory) storing a program, a CPU (Central Processing Unit) for executing a program stored in the ROM, and a RAM (Random Access Memory) that functions as an accessible storage device. The controller 17 outputs the information on the detected position of the user measured in the GPS 11 to the mobile device 20 using the communicator 16. The controller 17 calculates the direction of the user based on the detection values of the magnetic sensor 12 and the acceleration sensor 13, and outputs direction information indicating the calculated direction of the user to the mobile device 20 using the communicator 16. Further, the controller 17 acquires sound data from the mobile device 20 via the communicator 16, and outputs sound represented by the sound data from the sound output unit 15. Incidentally, the configuration included in the head-mounted device 10 is not limited to the above the GPS 11. The head-mounted device 10 has other components such as a switch for switching ON/OFF.

The mobile device 20 includes a communicator 21 and a controller 22. The mobile device 20 is a device that can be carried by a user, such as a smart phone. The mobile device 20 executes various applications such as a call and an Internet connection based on an input operation of a user. The communicator 21 communicates with the communicator 16 included in the head-mounted device 10 under short-range wireless communication standard. The communicator 21 communicates with the server 30 and the vehicle 40 via a telecommunication network 50. The controller 22 outputs information input from the user to the server through the communicator 21. In the present embodiment, the mobile device 20 is provided with a vehicle dispatch application for the user to apply for use of the vehicle 40. The user operates an input unit such as a touch panel to activate the vehicle dispatch application and input use application information necessary for the application to use the vehicle. The use application information includes at least usage information indicating that the user uses the vehicle, and includes information such as a usage start time, a departure position, a destination, and personal information. The controller 22 transmits the input use application information to the server 30 via the communicator 21. Based on the use application information, the server 30 assigns a vehicle that matches the user's desire to generate a vehicle dispatch schedule. The controller 22 displays the vehicle dispatch schedule generated by the server 30 on the display. The display displays the meeting point with the vehicle 40, a traveling route from the meeting point to the destination, departure time, the scheduled arrival time, and the like. The mobile device 20 includes not only the communicator 21, the controller 22 and the display but also other components.

The server 30 includes a communicator 31, a database 32, and a controller 33. The communicator 31 communicates with a plurality of mobile devices 20 and a plurality of vehicles 40 via a telecommunication network 50. The database 32 is a storage medium for storing map information. The map information includes information for representing road networks such as nodes and links, and facility information such as POIs (Point of Interest). The database 32 records management data for managing the vehicle 40, register data of the user, and the like. The controller 33 includes hardware and software, and includes a ROM (Read Only Memory) storing a program, a CPU (Central Processing Unit) for executing a program stored in the ROM, and a RAM (Random Access Memory) that functions as an accessible storage device.

The controller 33 executes a program stored in the ROM by the CPU to perform a vehicle management function for managing the vehicle, a guide function for guiding the vehicle and the meeting point. In the following, each function of the controller 33 is explained. In addition to the functions described below, the controller 33 has other functions such as a function for managing and updating map data recorded in the database 32.

The controller 33, by the vehicle management function, generates a vehicle dispatch schedule, and manages the vehicle 40 to travel along the vehicle dispatch schedule. In the vehicle dispatch schedule, a vehicle is dispatched according to the user's desire based on the use application information input from the mobile device 20. For example, when the user wants to receive an immediate vehicle dispatch, the controller 33 identifies the position of the user from the use application information, and identifies the vehicle 40 that is closest to the position of user and is not currently being applied for the other user. The controller 33 sets the identified vehicle 40 to the dispatched vehicle. The controller 33 sets a meeting point based on the present position of the dispatched vehicle and the present position of the user. The meeting point is a place where the user and the vehicle 40 meet and is suitable for parking the vehicle 40. The controller 33 calculates the traveling route from the present position of the vehicle to the meeting point and the arrival time of the vehicle to the meeting point. Then, the controller 33 includes the meeting point and the scheduled arrival time in the information on the vehicle dispatch schedule, and transmits the information to the mobile device 20 via the communicator 31. Further, the controller 33 transmits the information on the meeting point to the vehicle 40 via the communicator 31.

The controller 33, by the guide function, generates sound data for the user to identify the vehicle and outputs the sound data to the mobile device 20 through the communicator 31. The controller 33, by the guide function, generates sound data for the user to identify the meeting point, and outputs the sound data to the mobile device 20 through the communicator 31. The sound data for the user to identify the vehicle and the meeting point includes guidance information for identifying the vehicle and/or the place, and the guidance information is generated by the controller 22 and/or the controller 33. The specific processing of the guide function will be described later.

The vehicle 40 includes a GPS 41, a sensor 42, a communicator 43, an external indicator 44, and a controller 45. The GPS 41 is a system that measures the present position of vehicles. The sensor 42 is a sensor for detecting situations around a vehicle, such as a camera, radar, and the like. The sensor 42 also includes a sensor for detecting a traveling state of the vehicle, such as a vehicle speed sensor. The communicator 43 communicates with the mobile device 20 and the server 30 via a telecommunication network 50. The external indicator 44 is a device for presenting information to a person outside the vehicle, and is a device for outputting light to the outside of the vehicle 40. The controller 45 includes hardware and software, and includes a ROM that stores the program, a CPU that executes the program stored in the ROM, and a RAM that functions as an accessible storage device. The controller 45 is a unit for controlling the entire vehicle. Incidentally, the vehicle 40 includes not only the GPS 41 and the like, but also, for example, a light such as a small lamp or a winker, a headlamp or a tail lamp, and includes a configuration required for traveling of the vehicle such as an engine and/or a motor.

Figure 2B:
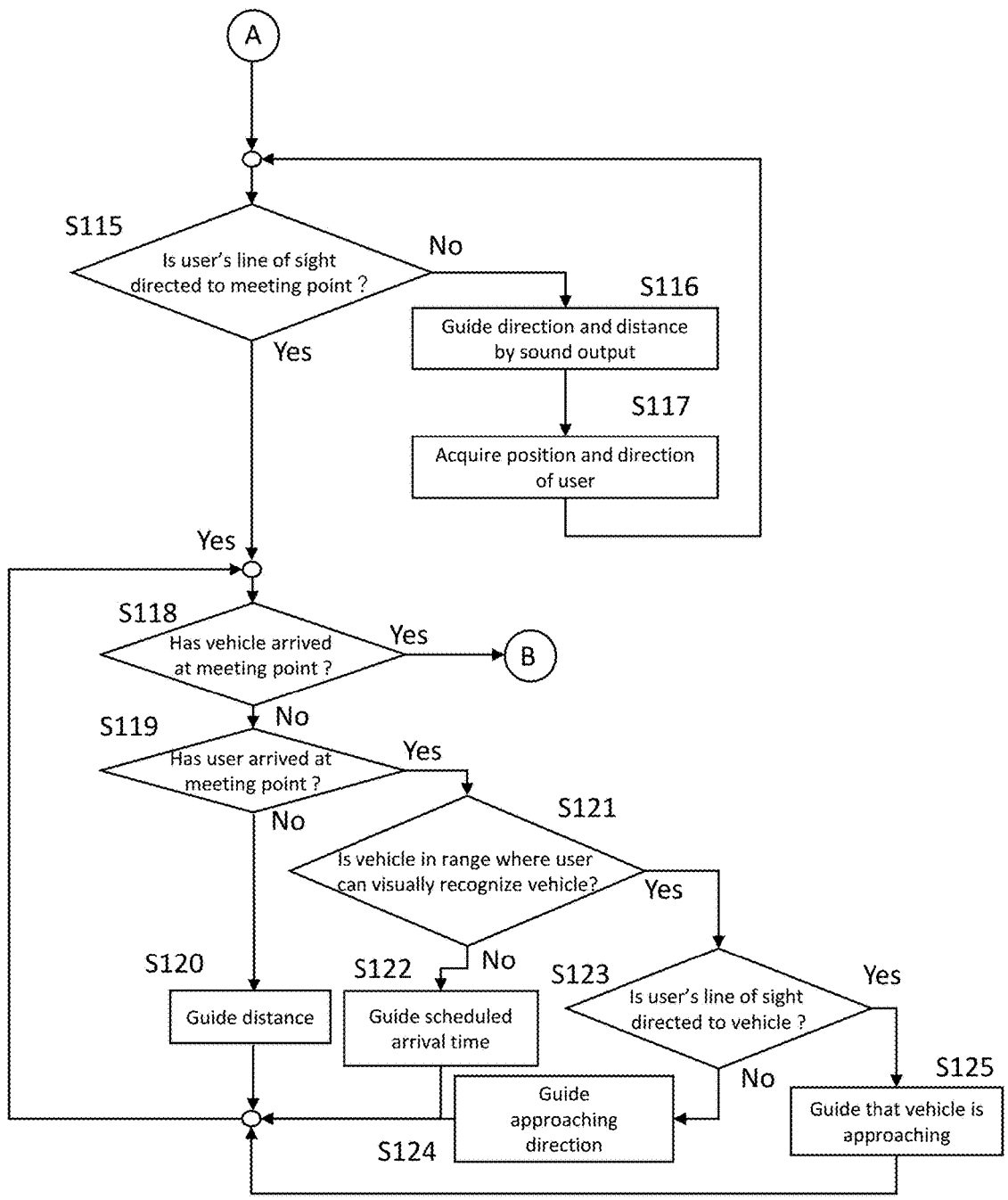
FIG. 2B is a flowchart showing an information processing procedure executed by the information processing system of FIG. 1.
Figure 2C:
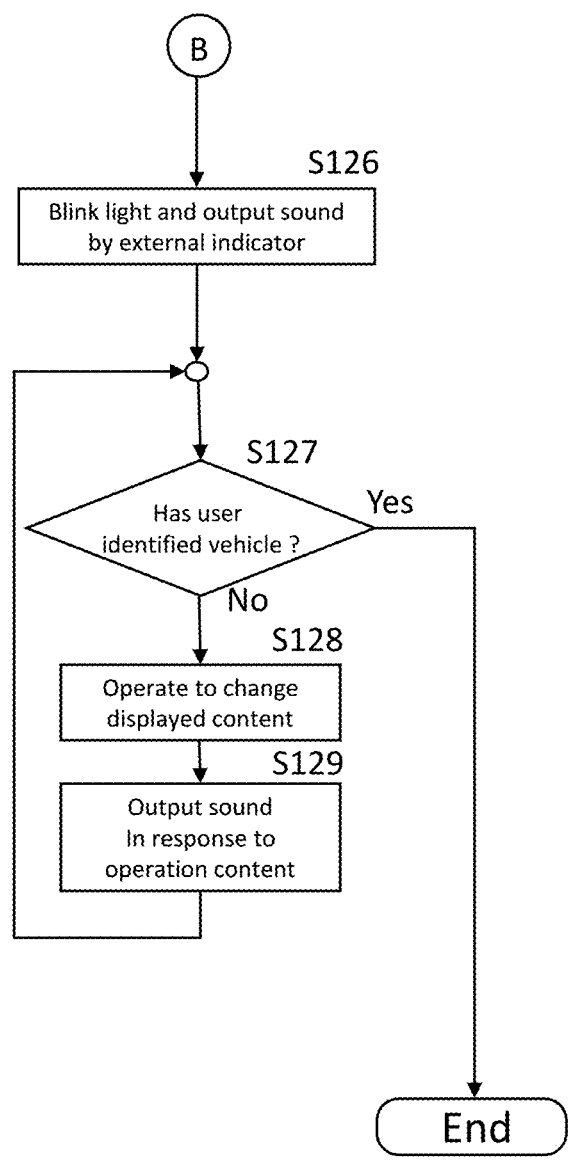
FIG. 2C is a flowchart showing an information processing procedure executed by the information processing system of FIG. 1.
Figure 3:
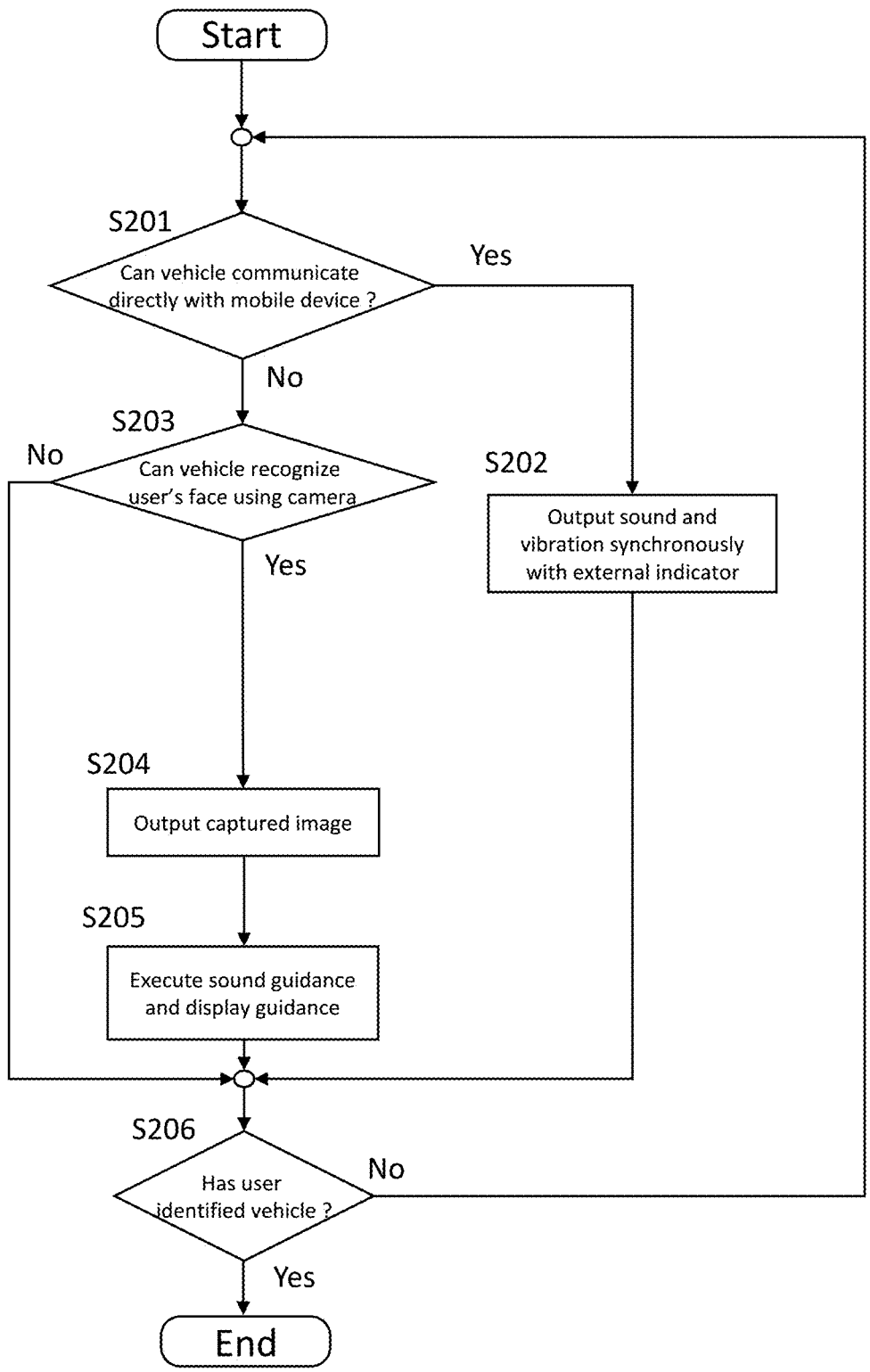
FIG. 3 is a flowchart showing an information processing procedure executed by the information processing system of FIG. 1.

Next, the respective control processes of the head-mounted device 10, the mobile device 20, the server 30, and the vehicle 40 included in the information processing system of the present embodiment will be described. FIG. 2A to FIG. 2C are flowcharts showing the control process of the servers 30. FIG. 3 is a flowchart showing a control process of the vehicle 40. The control flow shown in FIG. 2 shows the control flow which is a control flow after the server 30 acquires the use application information including the usage information indicating that the user wants to use the vehicle, and decides the vehicle dispatch schedule. The control flow is also a control flow from the time the user starts moving to the meeting point until the user identifies the dispatch vehicle. The following control flow is executed before the time at which the user starts using the vehicle.

In step S101, the controller 22 of the mobile device 20 determines whether or not an action to meet up has been started. For example, when the present time reaches a predetermined time before the time when the vehicle arrives at the meeting point, or when there is a request from the user to go to the meeting point based on the operation of the mobile device 20 by the user, the controller 22 determines that the action to meet up has been started. When the action to meet up is not started, the control process of the controller 22 is standby in step S101.

When the action to meet up has been started, in step S102, the controller 22 acquires information on the meeting point from the server 30 using the communicator 21. The information on the meeting point includes at least position information of the meeting point. Incidentally, when the information on the meeting point is stored in the memory of the mobile device 20, the controller 22 may acquire the information on the meeting point from the memory.

In step S103, the controller 22 communicates with the head-mounted device 10 using the communicator 21 to acquire position information indicating the present position of the user and direction information indicating the direction of the head of the user from the head-mounted device 10. In step S104, the controller 22 measures the distance between the present position of the user and the position of the meeting point and determines whether or not the present position of the user is far to the meeting point based on the measured distance. A distance threshold for determining whether the present position of the user is far or not is set in advance, and the controller 22 determines that the present position of the user is far to the meeting point when the measured distance is longer than the distance threshold. When the controller 22 determines that the present position of the user is not far to the meeting point, the control flow proceeds to step S108.

When determining that the present position of the user is far to the meeting point, in step S105, the controller 22 of the mobile device 20 generates the guidance information for guiding the route from the present position of the user to the meeting point, and outputs the guidance information to the head-mounted device 10. With the guidance information for guiding the route, the controller 22 guides sound information to the user, such as the direction in which the user should head and road information of the road in which the user should pass in accordance with the present position of the user. The guidance information is output as sound from the sound output unit 15 under the control of the controller 17 of the head-mounted device 10.

In step 106, the controller 22 of the mobile device 20 uses face authentication function to determine whether or not the user is watching the display of the mobile device 20. The controller 22 may acquire direction information indicating the direction of the head of the user from the head-mounted device 10, and determine whether the user is watching the display of the mobile device 20 based on the acquired direction information. When the user is not watching the mobile device 20, the control flow proceeds to step S103.

When the user is watching the mobile device 20, in step S107, the controller 22 displays, on the display, a map indicating the route from the present position of the user to the meeting point. After the controller 22 displays the map on the display, the control flow proceeds to step S103.

When determining that the present position of the user is not far to the meeting point in the control flow of the step S104, in step S108, the controller 22 determines whether or not the meeting point can be visible by the user based on the present distance between the present position of the user and the position of the meeting point. A visible distance where the meeting point can be visible by the user is set in advance. When a present distance from the present position of the user to the meeting point is equal to or less than the visible distance, the controller 22 determines that the meeting point can be visible by the user. When the controller 22 determines that the meeting point can be visible by the user, the control flow proceeds to step S115.

When determining that the meeting point cannot be visible by the user, in step S109, the controller 22 of the mobile device 20 generates guidance information for guiding the route from the present position of the user to the meeting point and outputs the guidance information to the head-mounted device 10. The control flow of the step S109 is the same as the control flow of the step S105.

In step 110, the controller 22 of the mobile device 20 determines whether the user is watching the display of the mobile device 20. The control flow of the step S110 is the same as the control flow of the step S106. When the user is not watching the mobile device 20, the control flow proceeds to step S103.

When the user is watching the mobile device 20, in step S111, the controller 22 acquires the position information on the present position of the vehicle from the vehicle 40, and determines whether or not the vehicle 40 has arrived at the meeting point. Incidentally, when the controller 22 of the mobile device 20 acquires information from the vehicle 40, and when the controller 22 of the mobile device 20 outputs information to the vehicle 40, the controller 22 of the mobile device 20 may communicate with the vehicle 40 via the server 30, or may communicate directly with the vehicle 40.

When the vehicle has not arrived at the meeting point, the controller 22 of the mobile device 20 generates a guide image including an object which is a landmark for the meeting point. The controller 22, for example, uses a map guide application of the mobile device 20 to generate the guide image. Incidentally, the controller 22 may generate the guide image for display by acquiring the information of the guide image from the server 30. The controller 22 displays a map indicating the route from the present position of the user to the meeting point and the guide image on the display. At this point, since the user is in a place where the user can visually recognize the meeting point, the user can easily identify the meeting point by relying on the guide image. Thereafter, the control flow proceeds to step S103.

When the vehicle has arrived at the meeting point, in step S113, the controller 22 of the mobile device 20 outputs a command signal for acquiring surrounding images of the vehicle 40 to the vehicle 40 via the server 30. When receiving the command signal, the controller 45 of the vehicle 40 captures the surrounding of the vehicle using a camera included in the sensor 42, and outputs, using the communicator 43, a signal including the captured image to the mobile device 20 via the server 30. In step S114, the controller 22 displays a map indicating a route from the present position of the user to the meeting point, and surrounding images acquired from the vehicle on the display. At this point, since the user is in a place where the user can visually recognize the meeting point, the user can easily identify the meeting point by relying on the surrounding images. Thereafter, the control flow proceeds to step S103.

Referring to FIG. 2B, the control flow will be described below. In step S115, the controller 22 of the mobile device 20 acquires direction information indicating the direction of the head of the user from the head-mounted device 10, and determines whether or not the user's line of sight direction is directed to the meeting point (whether or not the user is facing the direction of the meeting point) based on the acquired direction information.

When the user's line of sight direction is not directed to the direction of the meeting point, in step S116, the controller 22 generates guidance information including the direction (e.g., a compass point) of the meeting point and the distance to the meeting point relative to the present position of the user, and outputs the guidance information to the head-mounted device 10. The controller 17 of the head-mounted device 10 outputs, for example, a sound such as "The meeting point is 10 meters to the east." as the guidance information. In step S105 or S109, since the distance from the present position of the user to the meeting point is long, The guidance information for guiding the route is output, whereas in step S116, since the distance from the present position of the user to the meeting point is short, information on the meeting point (e.g., direction and distance) based on the present position of the user is output. In step S117, after acquiring the guidance information, the controller 22 of the mobile device 20 acquires the direction information indicating the direction of the head of the user, and the position information on the present position of the user from the head-mounted device 10. The control flow proceeds to step S115.

When the user's line of sight direction is directed to the meeting point, in step S118, the controller 22 outputs, to the server 30, a confirmation signal for confirming whether or not the vehicle has arrived at the meeting point. The controller 33 of the server 30 acquires the position information on the present position of the vehicle from the vehicle 40 based on the confirmation signal, and determines whether or not the vehicle 40 has arrived at the meeting point. Then, the controller 33 outputs a signal including the determination result to the mobile device 20. When the vehicle 40 has arrived at the meeting point, the control flow proceeds to step S126.

When the vehicle 40 has not arrived at the meeting point, in step S119, the controller 22 acquires the position information on the present position of the user from the head-mounted device 10, and determines whether or not the user has arrived at the meeting point.

When the user has not arrived at the meeting point, in step S120, the controller 22 measures the distance between the present position of the user and the position of the meeting point. The controller 22 generates guidance information including the measured distance, and outputs the guidance information to the head-mounted device 10. The head-mounted device 10 uses the sound output unit 15 for guiding, to the user, the distance to the meeting point. The head-mounted device 10 outputs, for example, a sound such as "The meeting point is 15 meters away in the present line of sight direction". Thereby, the user can identify that there is a meeting point ahead of the present line of sight direction and the distance to the meeting point. Then, the control flow proceeds to step S118.

When the user has arrived at the meeting point, in step S121, the controller 22 acquires the position information on the present position of the vehicle from the server 30 and determines whether or not the vehicle 40 is within a visible range where the user can visually recognize the vehicle 40. Alternatively, the controller 22 transmits the position information on the present position of the user to the server 30, and the controller 33 of the server 30 determines whether or not the vehicle 40 is within the visible range where the user can visually recognize the vehicle. For example, when the present position of the vehicle is within a predetermined visible range (e.g., 100 m radius) whose center is the meeting point, the controller 22 determines that the vehicle is within the visible range where the user can visually recognize the vehicle.

When the vehicle is out of the visible range where the user can visually recognize the vehicle, in step 122, the controller 22 transmits a confirmation signal for confirming the time at which the vehicle 40 arrives at the meeting point to the server 30. The controller 33 of the server 30 calculates the scheduled arrival time of the vehicle 40 using the present position of the vehicle, the position of the meeting point, the traveling route, traffic information and the like, and outputs a signal including the calculation result to the mobile device 20. Then, the controller 22 of the mobile device 20 outputs the information on the scheduled arrival time to the head-mounted device 10. The head-mounted device 10 uses the sound output unit 15 to guide the scheduled arrival time of the vehicle 40. That is, when the user has arrived at the meeting point, the controller 22 and/or the controller 33 outputs information on the scheduled arrival time of the vehicle 40 to the head-mounted device 10 as the guidance information for identifying the vehicle by the control flow of S122 of steps. Then, the head-mounted device 10 guides the scheduled arrival time of the vehicle 40 by sound output, thereby the user can figure out how long it will take for the vehicle to arrive and be visible to the user. The control flow then proceeds to step 118.

When the vehicle 40 is within the visible range where the user can visually recognize the vehicle, in step S123, the controller 22 of the mobile device 20 acquires the direction information indicating the direction of the head of the user from the head-mounted device 10, and transmits a confirmation signal to the server 30 to confirm whether or not the user's line of sight direction is directed to the vehicle 40. The controller 33 of the server 30 determines whether or not the user's line of sight direction is directed to the vehicle 40 based on the present position of the user, the direction of the head of the user and the present position of the vehicle 40, and outputs a signal including the determination result to the mobile device 20. That is, by executing the control flows of the step S121 and the step S123, the controller 22 and/or the controller 33 determine whether or not the vehicle 40 is at a position in which the user can visually recognize the vehicle based on the relationship between the direction of the head of the user and the position of the vehicle, or the relationship between the user's line of sight direction and the position of the vehicle. When the user's line of sight direction is not directed to the vehicle 40, in step S124, the controller 22 generates guidance information indicating the direction in which the vehicle is visible when viewed from the user relative to the present position of the user, and outputs the guidance information to the head-mounted device 10. The controller 17 of the head-mounted device 10 outputs, for example, a sound such as "The vehicle is approaching the meeting point from the east direction." As the guidance information. That is, when the user has arrived at the meeting point but the user is not facing the direction of the vehicle, the controller 22 outputs information indicating the direction in which the vehicle is visible when viewed from the user to the head-mounted device 10 as information for identifying the vehicle. Then, the head-mounted device 10 guides the direction in which the vehicle is visible when viewed from the user by sound output. This enables the user to grasp from which direction the vehicle is approaching. The control flow then proceeds to step 118.

When the user's line of sight direction is not directed to the vehicle 40, in step S125, the controller 22 measures the distance between the present position of the vehicle 40 and the position of the meeting point (the present position of the user), and outputs distance information on the measured distance to the head-mounted device 10. The head-mounted device 10 uses the sound output unit 15 to output sound such as "the vehicle is currently traveling 10 meters away in the line of sight direction and approaching the meeting point." That is, when the user has arrived at the meeting point and the user is facing the direction of the vehicle, the controller 22 guides the distance from the present position of the user to the vehicle as information for identifying the vehicle. Then, the head-mounted device 10 provides sound guidance as to how far the vehicle is away from the user in the line of sight direction. This enables the user to grasp how many meters away the vehicle is. In particular, even when a plurality of vehicles that are the same as or similar to the dispatched vehicle on which the user is to ride are traveling, the user can identify the dispatched vehicle based on the distance. Since the user is guided by sound, by fixing the present line of sight direction, the user can grasp that the dispatched vehicle is at a visible distance where the use can visually recognize the vehicle. As a result, the user can easily identify the vehicle to be ridden. Then, the control flow proceeds to step S118.

Referring to FIG. 2C, the control flow will be described below. When the vehicle 40 has arrived at the meeting point, in step S126, the controller 22 of the mobile device 20 transmits a command signal for blinking the light in the external indicator 44 of the vehicle 40 to the vehicle 40, and outputs, to the head-mounted device 10, a command signal for outputting the sound from the sound output unit 15 in accordance with the timing of the blinking. The head-mounted device 10 guides the user to identify the vehicle 40 by outputting the sound corresponding to the command signal from the sound output unit 15.

In step S127, the controller 22 of the mobile device 20 determines whether or not the user has identified the vehicle 40. For example, the controller 22 determines whether or not the user has identified the vehicle 40 by acquiring information indicating that the user has operated the mobile device or, from the vehicle 40, information indicating that the user has operated the door knob of the vehicle 40.

When the user cannot identify the vehicle 40, in step S128, the controller 22 changes the content to be displayed on the external indicator 44 by the user's operation of the mobile device 20, and transmits, to the vehicle 40, a command signal for displaying the changed content on the external indicator 44. In step S129, the controller 22 outputs, to the head-mounted device 10, a command signal for outputting a sound corresponding to the changed display content by the sound output unit 15. The head-mounted device 10 guides the user to identify the vehicle 40 by outputting a sound corresponding to the command signal by the sound output unit 15. Then, the control flow proceeds to step S127. In the control flow of the step S127, the controller 22 of the mobile device 20 ends the control flow shown in FIG. 2C when determining that the user has identified the vehicle 40.

Next, a control flow for identifying a user by the vehicle will be described with reference to FIG. 3.

In step S201, the controller 45 of the vehicle 40 determines whether the vehicle 40 can communicate directly with the mobile device 20. The controller 45 uses unique ID for short-distance communication to establish short-distance communication with the mobile device 20, thereby determining whether or not the controller 45 can directly communicate with the user, that is, the mobile device 20. When the controller 45 can directly communicate with the mobile device 20, in step S202, the controller 45 sets emission timing of the external indicator 44 to a predetermined cycle. After setting the emission timing of the external indicator, the controller 45 outputs light at the predetermined cycle, and outputs a command signal to the mobile device 20 so that the sound is synchronously output with the predetermined cycle. The head-mounted device 10 receives the command signal from the mobile device 20 and outputs the sound at a predetermined cycle. The head-mounted device 10 also provides the sound guidance that the vehicle is approaching. Then, the control flow proceeds to step S206.

When the controller 45 cannot directly communicate with the mobile device 20, in step S203, the controller 45 recognizes the user's face using the face recognition function with the camera included in the sensor 42. When the face is recognized, the controller 45 captures an image by the camera, and outputs the captured image including the scene around the recognized face to the mobile device 20 via the server 30. In step S205, the controller 45 estimates a present direction of the user's face from the captured image, and outputs, to the mobile device 20, guidance information indicating which direction the user should turn his or her face to via the server 30. That is, the guidance information includes direction information for the user to identify the vehicle, and recognition information indicating that the vehicle recognizes the user. The head-mounted device 10 receives the guidance information from the mobile device 20 and outputs a sound such as "Look to the right. You can see the dispatched vehicle." As a result, the user can recognize that the vehicle recognizes the user, and the user can turn his or her head in the direction of the vehicle. In step S206, the controller 45 of the vehicle 40 determines whether or not the user has identified the vehicle 40. This determination may be performed using the determination result of the step S127. When the user has identified the vehicle 40, the control flow shown in FIG. 3 ends.

As described above, according to the present embodiment, the controller 22 and/or the controller 33 acquire position information indicating the position of the vehicle 40 and position information indicating the position of the mobile device, which corresponds to the head-mounted device 10 and/or the mobile device 20, and output the sound data for identifying the vehicle from the communicator to the mobile device in accordance with the relationship between the position of the vehicle 40 and the position of the mobile device 20. This prevents the user's line of sight from being fixed to a single point when guiding the position and the like of the vehicle, so that the user can easily identify the vehicle to be ridden.

In the present embodiment, the controller 22 and/or controller 33 change the type of guidance information included in the sound data to be output to the mobile device, in accordance with the relative distance between the position of the vehicle 40 and the position of the mobile device. As a result, the user can easily identify the vehicle to be ridden.

In the present embodiment, the controller 22 and/or the controller 33 change the type of guidance information included in the sound data to be output to the mobile device in accordance with the relative distance between the position of the meeting point for the vehicle and the user and the position of the mobile device. As a result, the user can easily identify the vehicle to be ridden.

In the present embodiment, the controller 22 and/or the controller 33 acquire direction information indicating the direction of the head of the user or direction information indicating the user's line of sight direction, and output sound data to the mobile device in accordance with the relationship between the direction of the head and the position of the vehicle, or the relationship between the line of sight direction and the position of the vehicle. This prevents the user's line of sight from being fixed to a single point when guiding the direction of the vehicle and the like, so that the user can easily identify the vehicle to be ridden.

Further, in the present embodiment, the controller 22 and/or the controller 33 acquire direction information indicating the direction of the head of the user or direction information indicating the user's line of sight direction, and include, in the sound data, information indicating the direction in which the vehicle 40 is visible when viewed from the user to output the sound data to the mobile device in accordance with the relationship between the direction of the head and the position of the vehicle or the relationship between the line of sight direction and the position of the vehicle. As a result, in order for the user to visually recognize the vehicle 40, the direction the user should face can guided according to the present position of the head of the user.

Further, in the present embodiment, the controller 22 and/or the controller 33 acquire direction information indicating the direction of the head of the user or direction information indicating the user's line of sight direction, determine whether or not the vehicle is at a position where the user can visually recognize the vehicle based on the relationship between the direction of the head and the position of the vehicle or the relationship between the line of sight direction and the position of the vehicle, and output the sound data to the mobile device in accordance with the determination result. As a result, it is possible to change the guidance according to the result of the determination as to whether or not the user can visually recognize the vehicle 40.

Further, in the present embodiment, when determining that the vehicle 40 is at the position where the user can visually recognize the vehicle, the controller 22 and/or the controller 33 include, in the sound data, information indicating the direction in which the vehicle 40 is visible when viewed from the user to output the sound data to the mobile device. Thus, the user can easily identify from which direction the vehicle is approaching.

Further, in the present embodiment, the controller 22 and/or the controller 33 acquire recognition information indicating that the vehicle recognizes the user, and, when acquiring the recognition information, include, in the sound data, information indicating that the vehicle 40 recognizes the user to output the sound data to the mobile device. Thus, the user can easily identify that the vehicle 40 is nearby.

Further, in the present embodiment, the controller 22 and/or the controller 33 acquire usage information indicating that the user uses the vehicle, and after acquiring the usage information, execute a control process for outputting the sound data. As a result, the user can easily identify the vehicle to be ridden.

Further, in the present embodiment, the controller 22 and/or the controller 33 set the use start time at which the user starts using the vehicle 40, and execute the control process for outputting the sound data before the use start time. Thus, the user can identify a vehicle to be ridden before using the vehicle 40.

Further, in the present embodiment, the controller 22 and/or the controller 33 execute a control process (corresponding to the control flow from step S121 to step S125 shown in FIG. 2B) for outputting the sound data when the user arrives at the meeting point. As a result, at the meeting point, the user can easily identify the vehicle to be ridden.

Further, in the present embodiment, the mobile device transmits a command signal corresponding to the operation of the user to the vehicle, and the vehicle 40 has an external indicator 44 for outputting light to the outside of the vehicle 40 when receiving a command signal. As a result, the user can easily identify the vehicle to be ridden.

Further, in the present embodiment, when determined that the vehicle is at a position where the user can visually recognize the vehicle, the controller 22 and/or the controller 33 outputs a command signal for outputting light from the external indicator 44 to the vehicle 40. As a result, the user can easily identify the vehicle to be ridden.

Further, in the present embodiment, when the vehicle 40 is traveling, the controller 22 and/or the controller 33 prohibit the output of a command signal for outputting light from the external indicator 44 to the vehicle 40. As a result, this prevent the other traveling vehicles from being obstructed.

In the present embodiment, of the control flow shown in FIG. 2, the control flow executed by the controller 22 may be executed by the controller 33, and at this time, the mobile device 20 may operate as a communication device capable of communicating between the head-mounted device 10 and the server.

In the present embodiment, the GPS for measuring the present position of the user may be provided in the mobile device 20. When the communicator 16 of the head-mounted device 10 can communicate with the server 30, the mobile device 20 may be omitted and the head-mounted device 10 may function as a mobile device. However, in the case of omitting the mobile device 20, the control flow executed by the controller 22 in the control flow shown in FIG. 2 may be executed by the controller 33 after omitting the flow for controlling the display of the display of the mobile device 20 in the control flow shown in FIG. 2.

EXPLANATIONS OF LETTERS OR NUMERALS

10 . . . Head-mounted device
11 . . . GPS
12 . . . Magnetic sensor
13 . . . Acceleration sensor
14 . . . Contact sensor
15 . . . Sound output unit
16 . . . Communicator
17 . . . Controller
20 . . . Mobile device
21 . . . Communicator
22 . . . Controller
30 . . . Server
31 . . . Communicator
32 . . . Database
33 . . . Controller
40 . . . Vehicle
41 . . . GPS
42 . . . Sensor
43 . . . Communicator
44 . . . External indicator
45 . . . Controller
50 . . . Telecommunication Network

The invention claimed is:

1. An information processing device comprising:
a communicator for communicating with a vehicle and a mobile device operated by a user; and
a controller for controlling the communicator, wherein the controller:
determines whether or not the vehicle has arrived at a meeting point;
when determining that the vehicle has not arrived at the meeting point, determines whether or not the user has arrived at the meeting point;
when determining that the user has arrived at the meeting point, determines whether or not a relative distance is within a range in which the user can visually recognize the vehicle, the relative distance being a distance between a position of the vehicle and a position of the mobile device;
generates time information on arrival of the vehicle at the meeting point as a guidance information when determining that the relative distance is not within the range in which the user can visually recognize the vehicle;
generates at least one of information indicating a direction in which the vehicle is visible when viewed from the user and information on a distance between the vehicle and the user as the guidance information when determining that the relative distance is within the range in which the user can visually recognize the vehicle; and
outputs sound data including the guidance information from the communicator to the mobile device.

2. The information processing device according to claim 1, wherein the controller changes a type of the guidance information included in the sound data to be output to the mobile device in accordance with relative distances among the position of the vehicle, a position of a meeting point for the user and the position of the mobile device.

3. The information processing device according to claim 1, wherein the controller:
acquires direction information indicating a direction of a head of the user or direction information indicating a line of sight direction of the user, and position information indicating a position of the vehicle;
determines whether or not the vehicle is at a position where the user can visually recognize the vehicle based on a relationship between the direction of the head and the position of the vehicle, or a relationship between the line of sight direction and the position of the vehicle; and
outputs the sound data to the mobile device in accordance with a result of the determination.

4. The information processing device according to claim 3, wherein when determining that the vehicle is at the position where the user can visually recognize the vehicle, the controller outputs the sound data that includes information indicating a direction in which the vehicle is visible when viewed from the user to the mobile device.

5. The information processing device according to claim 1, wherein the controller:
acquires recognition information indicating that the vehicle recognizes the user; and
when acquiring the recognition information, outputs the sound data that includes information indicating that the vehicle recognizes the user to the mobile device.

6. The information processing device according to claim 1, wherein the controller:
acquires usage information indicating that the user uses the vehicle; and
after acquiring the usage information, executes a control process for outputting the sound data.

7. The information processing device according to claim 1, wherein the controller:
sets a use start time at which the user starts using the vehicle; and
executes a control process for outputting the sound data before the use start time.

8. The information processing device according to claim 1, wherein the controller:
sets a meeting point indicating a place where the user and the vehicle meet; and
executes a control process for outputting the sound data when the user arrives at the meeting point.

9. An information processing system comprising the information processing device according to claim 1, the vehicle and the mobile device,
wherein the mobile device transmits a command signal corresponding to an operation of the user to the vehicle; and
wherein the vehicle has a display device for outputting light to the outside of the vehicle when receiving the command signal.

10. An information processing system comprising: the information processing device according to claim 6, the vehicle, and the mobile device,
wherein the vehicle has a display device for outputting light to the outside of the vehicle, and
wherein the controller outputs a command signal for outputting light from the display device to the vehicle when determining that the vehicle is at a position where the user can visually recognize the vehicle.

11. The information processing system according to claim 10, wherein the controller prohibits an output of the command signal when the vehicle is traveling.

12. An information processing method for processing information using a communicator for communicating with a vehicle, a mobile device operated by a user, and a controller, wherein the controller:
determines whether or not the vehicle has arrived at a meeting point;
when determining that the vehicle has not arrived at the meeting point, determines whether or not the user has arrived at the meeting point;
when determining that the user has arrived at the meeting point, determines whether or not a relative distance is within a range in which the user can visually recognize the vehicle, the relative distance being a distance between a position of the vehicle and a position of the mobile device;
generates time information on arrival of the vehicle at the meeting point as a guidance information when determining that the relative distance is not within the range in which the user can visually recognize the vehicle;
generates at least one of information indicating a direction in which the vehicle is visible when viewed from the user and information on a distance between the vehicle and the user as the guidance information when determining that the relative distance is within the range in which the user can visually recognize the vehicle; and
outputs sound data including the guidance information from the communicator to the mobile device.

* * * * *